(12) United States Patent
Goda

(10) Patent No.: US 12,405,354 B2
(45) Date of Patent: Sep. 2, 2025

(54) ON-VEHICLE OBJECT DETECTION SYSTEM

(71) Applicant: Mitsubishi Electric Corporation, Tokyo (JP)

(72) Inventor: Yuichi Goda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 456 days.

(21) Appl. No.: 17/604,682

(22) PCT Filed: May 14, 2019

(86) PCT No.: PCT/JP2019/019035
§ 371 (c)(1),
(2) Date: Oct. 18, 2021

(87) PCT Pub. No.: WO2020/230253
PCT Pub. Date: Nov. 19, 2020

(65) Prior Publication Data
US 2022/0206110 A1     Jun. 30, 2022

(51) Int. Cl.
*G01S 7/40*     (2006.01)
*G01N 22/00*    (2006.01)
*G01S 13/931*   (2020.01)

(52) U.S. Cl.
CPC ............... *G01S 7/40* (2013.01); *G01N 22/00* (2013.01); *G01S 13/931* (2013.01)

(58) Field of Classification Search
CPC .......... G01S 7/40; G01S 13/931; G01N 22/00
USPC ......................................................... 342/173
See application file for complete search history.

(56) References Cited

U.S. PATENT DOCUMENTS

| | | |
|---|---|---|
| 6,369,747 B1 | 4/2002 | Ashihara |
| 2006/0196272 A1 | 9/2006 | Sugiura et al. |
| 2007/0013576 A1 | 1/2007 | Shingyoji et al. |
| 2009/0107243 A1 | 4/2009 | Sugiura et al. |
| 2009/0178486 A1 | 7/2009 | Klee et al. |

(Continued)

FOREIGN PATENT DOCUMENTS

| | | | |
|---|---|---|---|
| EP | 3496067 A1 * | 6/2019 | .............. E02F 9/261 |
| JP | 2000-241538 A | 9/2000 | |

(Continued)

OTHER PUBLICATIONS

Vokurka et al, "Antenna Measurements, RCS Measurements and Measurements on Pulsed Signals with Vector Network Analyzers," Rohde and Schwartz, Aug. 2004—id-No. 1EZ52_OE (Year: 2004).*

(Continued)

*Primary Examiner* — Bernarr E Gregory
*Assistant Examiner* — Samarina Makhdoom
(74) *Attorney, Agent, or Firm* — Sughrue Mion, PLLC

(57) ABSTRACT

The difference between a plurality of road surface reflection levels detected by a plurality of object detection apparatuses mounted to a vehicle is calculated, and when the difference exceeds a range of values determined in advance, a control apparatus determines that there is an abnormality in any of the plurality of object detection apparatuses. Accordingly, without causing statistical processing to be complicated, occurrence of an abnormality in the object detection apparatus can be determined less erroneously than before.

21 Claims, 18 Drawing Sheets

(56) References Cited

U.S. PATENT DOCUMENTS

| | | | |
|---|---|---|---|
| 2012/0001769 A1* | 1/2012 | Nitanda | G01S 17/42 340/901 |
| 2012/0013500 A1* | 1/2012 | Markin | G01S 3/08 342/149 |
| 2015/0309165 A1* | 10/2015 | Elwart | G01S 13/931 342/61 |
| 2018/0284787 A1* | 10/2018 | Naka | G05D 1/0257 |
| 2018/0306889 A1* | 10/2018 | Koga | G08G 1/165 |
| 2018/0329033 A1* | 11/2018 | Pratt | E01F 9/30 |
| 2019/0041528 A1* | 2/2019 | Schüttpelz | H04L 27/2278 |
| 2019/0101621 A1* | 4/2019 | Machida | G01S 13/931 |

FOREIGN PATENT DOCUMENTS

| | | | | |
|---|---|---|---|---|
| JP | 2000-304846 A | | 11/2000 | |
| JP | 2006-023236 A | | 1/2006 | |
| JP | 2006-242650 A | | 9/2006 | |
| JP | 2008249405 A | * | 10/2008 | ............... G01S 7/40 |
| JP | 2013-140072 A | | 7/2013 | |
| JP | 2016-048179 A | | 4/2016 | |
| JP | 2016-166752 A | | 9/2016 | |
| WO | WO-2012087150 A1 | * | 6/2012 | ............... B60T 8/172 |
| WO | WO-2019052896 A1 | * | 3/2019 | ............ B60W 40/06 |

OTHER PUBLICATIONS

Notice of Reasons for Refusal dated Jun. 14, 2022 from the Japanese Patent Office in Japanese Application No. 2021-519090.
International Search Report for PCT/JP2019/019035 dated Aug. 13, 2019 [PCT/ISA/210].
Written Opinion for PCT/JP2019/019035 dated Aug. 13, 2019 [PCT/ISA/237].
Chinese Office Action dated Feb. 8, 2024 in App. No. 201980096196.X.
Communication dated Jun. 27, 2024, issued in Chinese Application No. 201980096196.X.

* cited by examiner

FIG.4

|  | RADAR APPARATUS 11 | RADAR APPARATUS 12 |
|---|---|---|
| RADAR APPARATUS 11 |  | NO ABNORMALITY |
| RADAR APPARATUS 12 | NO ABNORMALITY |  |

FIG.5

|  | RADAR APPARATUS 11 | RADAR APPARATUS 12 |
|---|---|---|
| RADAR APPARATUS 11 |  | ABNORMALITY PRESENT |
| RADAR APPARATUS 12 | ABNORMALITY PRESENT |  |

FIG.6

|  | RADAR APPARATUS 11 | RADAR APPARATUS 12 |
|---|---|---|
| RADAR APPARATUS 11 |  | 2 deg UPWARD |
| RADAR APPARATUS 12 | 2 deg DOWNWARD |  |

FIG.7

|  | RADAR APPARATUS 11 | RADAR APPARATUS 12 |
|---|---|---|
| RADAR APPARATUS 11 |  | ORIENTATED UPWARD |
| RADAR APPARATUS 12 | ORIENTATED DOWNWARD |  |

FIG.8

|  | RADAR APPARATUS 11 | RADAR APPARATUS 12 | RADAR APPARATUS 13 |
|---|---|---|---|
| RADAR APPARATUS 11 |  | ABNORMALITY PRESENT | ABNORMALITY PRESENT |
| RADAR APPARATUS 12 |  |  | NO ABNORMALITY |
| RADAR APPARATUS 13 |  |  |  |

ON-VEHICLE OBJECT DETECTION SYSTEM

CROSS REFERENCE TO RELATED APPLICATIONS

This application is a National Stage of International Application No. PCT/JP2019/019035 filed May 14, 2019.

TECHNICAL FIELD

The present disclosure relates to an on-vehicle object detection system.

BACKGROUND ART

To date, a radar apparatus provided with a processing device that detects the position of an object to be detected, on the basis of a transmission signal from radar beam transmission means and a reception signal from reception means, has been known. This processing device is composed of signal discrimination means, road surface reflection analysis means, and abnormality determination means. A low intensity spectrum signal separated by the signal discrimination means is analyzed by the road surface reflection analysis means, and when no reflection signal from a road surface is detected, it is determined that there is an abnormality in the radar apparatus.

CITATION LIST

Patent Literature

Patent Document 1: Japanese Laid-Open Patent Publication No. 2000-241538

SUMMARY OF THE INVENTION

Problems to be Solved by the Invention

However, the reflection intensity of a road surface changes depending on the state of the road surface. For example, in the case of a road where reflection from the ground is strong, such as an asphalt road and a gravel road, the reflection intensity is high, whereas in the case of a road surface having less back scattering than an asphalt road surface, such as a concrete road surface and a wet road surface, the reflection intensity is low. Therefore, in the case of conventional art, there is a difference in the reflection intensity due to such road surface states.

Such a difference in the reflection intensity due to road surface states may cause an erroneous determination that there is an abnormality even when no abnormality has occurred. In contrast, when a threshold for determining that there is an abnormality is set to be high in order to prevent erroneous abnormality determination, there is a risk that it is not determined that there is an abnormality even when an abnormality has occurred. This results in a traveling scene where an abnormality in a radar apparatus cannot be accurately determined as an abnormality. In addition, in order to prevent erroneous abnormality determination, if statistical processing, such as averaging using road surface reflection levels in a long time period, is performed, a certain time period is required before determination of an abnormality is made. This poses a problem that an abnormality cannot be found early, for example.

The present disclosure has been made in order to solve the above-described problem. An object of the present disclosure is to provide an on-vehicle object detection system that can determine, less erroneously than before, occurrence of an abnormality in an object detection apparatus such as a radar apparatus, without causing statistical processing to be complicated.

Solutions to the Problems

An on-vehicle object detection system according to the present disclosure includes:
  a plurality of object detection apparatuses mounted to a vehicle;
  a road surface reflection level reception unit for receiving a plurality of road surface reflection levels detected by the plurality of object detection apparatuses; and
  an object detection apparatus abnormality determination unit for calculating a difference between two or more road surface reflection levels having been received, and for determining, when the difference exceeds a range of values determined in advance, that any of the plurality of object detection apparatuses has an abnormality.

Effect of the Invention

According to the on-vehicle object detection system of the present disclosure, road surface reflection levels are compared between a plurality of object detection apparatuses, and thus, occurrence of an abnormality in an object detection apparatus can be determined less erroneously than before.

BRIEF DESCRIPTION OF THE DRAWINGS

FIG. 4 is a diagram showing an abnormality determination result regarding two radar apparatuses.

FIG. 5 is another diagram showing an abnormality determination result regarding two radar apparatuses.

FIG. 6 is a diagram showing axial deviations of two radar apparatuses.

FIG. 7 is another diagram showing axial deviations of two radar apparatuses.

FIG. 8 is a diagram showing an abnormality determination result regarding three radar apparatuses.

DESCRIPTION OF EMBODIMENTS

Figure 1:
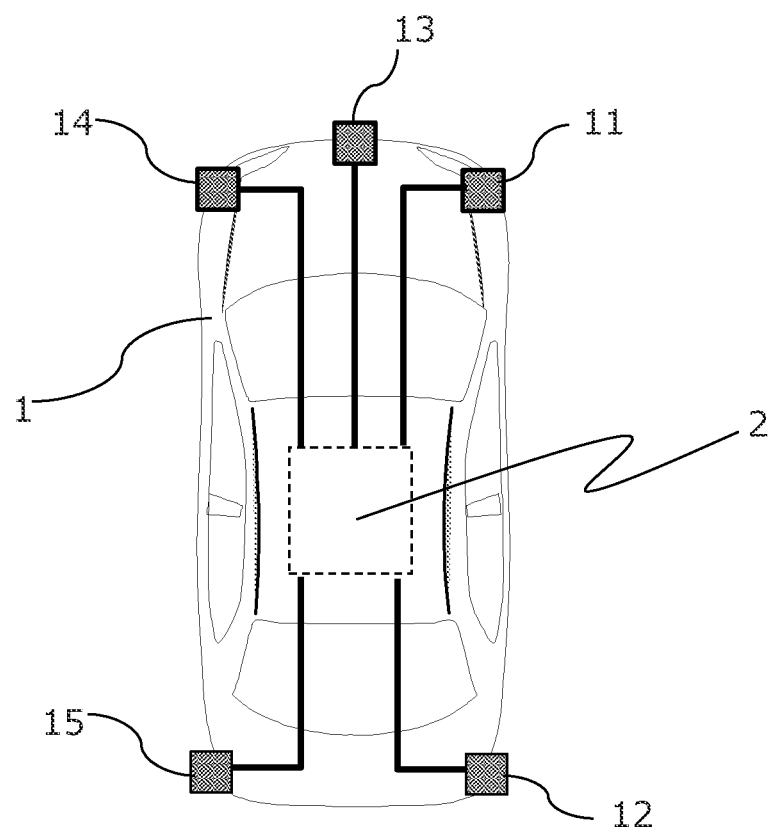
FIG. 1 is a schematic configuration diagram of an on-vehicle object detection system in embodiment 1.

Hereinafter, a preferred embodiment of an on-vehicle object detection system according to the present disclosure will be described with reference to the drawings. The same parts and corresponding parts are denoted by the same reference characters, and detailed description thereof is omitted. Also, in embodiments after this embodiment, description of parts denoted by the same reference characters is omitted.

Embodiment 1

[Basic Configuration and Basic Operation]

FIG. 1 is a schematic configuration diagram of an on-vehicle object detection system. As an object detection apparatus, radar apparatuses 11 to 15 are installed at front, rear, left, and right portions of a vehicle 1. A control apparatus 2 receives, aggregates, and processes information from the radar apparatuses 11 to 15.

The radar apparatuses 11 to 15 each have a radar function of emitting a radio wave to a peripheral object, receiving a reflected wave, and measuring the distance to the peripheral object, a relative speed, an angle, a reflection level, and the like. Further, each radar apparatus 11 to 15 is configured to be able to obtain a reflection level at least from a road surface. The reflection level from the road surface may be an instantaneously-measured value or a value obtained by averaging values measured for a certain time period. Through time averaging, determination can be performed with a sudden change of the road surface state suppressed, and the determination result can be stabilized. As long as reception results of reflected waves of at least two radar apparatuses are inputted to the control apparatus, an object detection apparatus abnormality determination unit described later can perform determination operation. The object detection apparatus may be, other than a radar apparatus, another sensor that is configured to be able to detect a road surface and detect the reflection level of the road surface, and may be LIDAR (Laser Imaging Detection and Ranging), an ultrasonic sensor, or the like. The following description is based on a radar apparatus, but similar functions and operations are exhibited also in the case of another sensor. The radar apparatus is denoted as a radar in the drawings.

Figure 2:
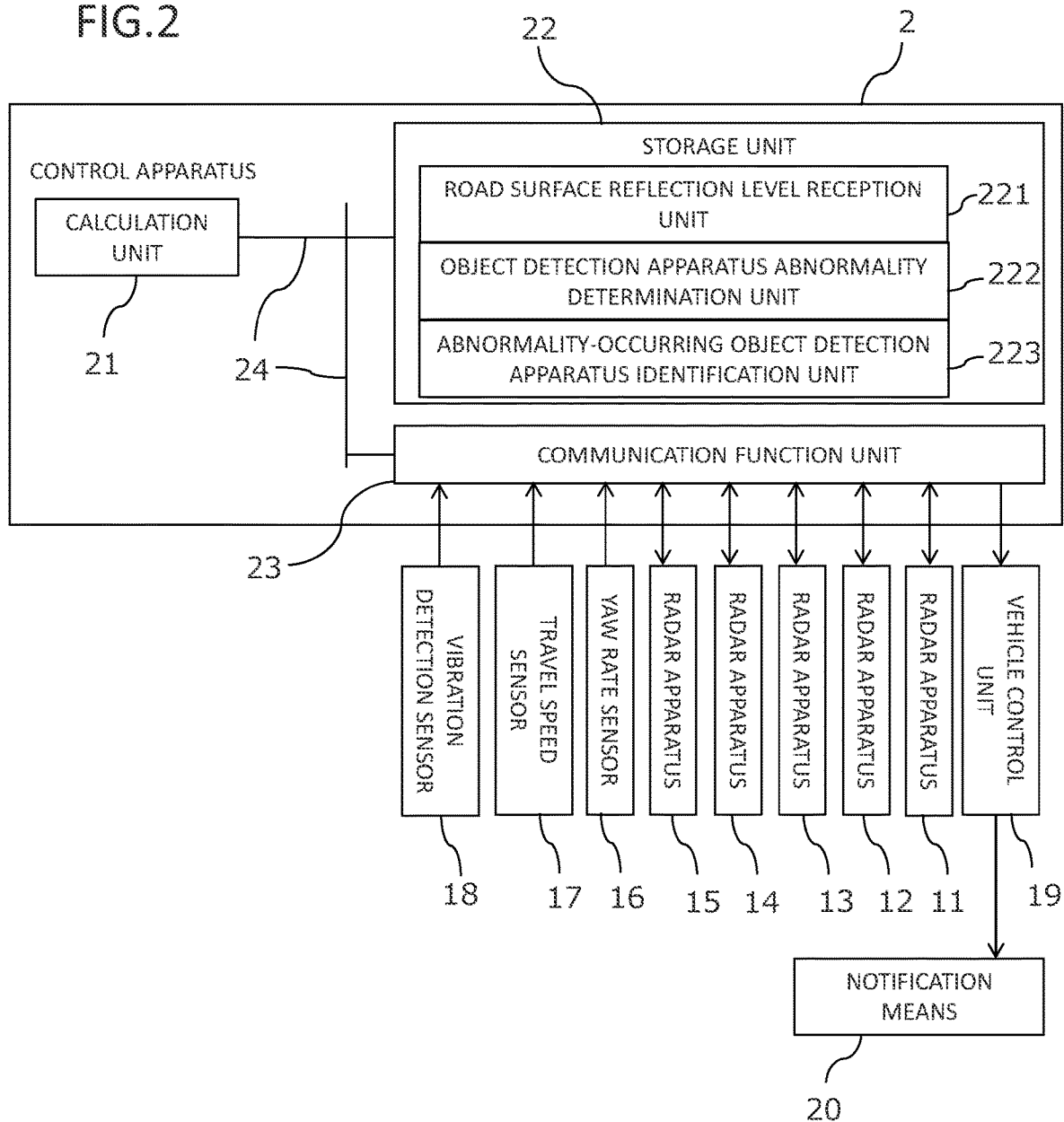
FIG. 2 is a block configuration diagram of a control apparatus of embodiment 1.

FIG. 2 is a block configuration diagram of the control apparatus 2. The control apparatus 2 includes a calculation unit 21, a storage unit 22, a communication function unit 23, and a bus 24 for performing bidirectional transmission/reception of a signal between these units. The calculation unit 21, the storage unit 22, and the communication function unit 23 are connected so as to be able to perform bidirectional communication via the bus 24. The calculation unit 21 is implemented as a calculation device such as a microcomputer or a DSP (Digital Signal Processor). The storage unit 22 is implemented as a RAM (Random Access Memory) and a ROM (Read Only Memory). The storage unit 22 includes a road surface reflection level reception unit 221, an object detection apparatus abnormality determination unit 222, and an abnormality-occurring object detection apparatus identification unit 223 that are for determining an object detection apparatus in which an abnormality has occurred.

The radar apparatuses 11 to 15, a yaw rate sensor 16, a travel speed sensor 17, a vibration detection sensor 18, and a vehicle control unit 19 are connected to the communication function unit 23 via respective signal lines. Detection information is inputted from the radar apparatuses 11 to 15, the yaw rate sensor 16, the travel speed sensor 17, and the vibration detection sensor 18, and a drive control signal and a measurement result of each radar apparatus 11 to 15 are outputted to the vehicle control unit 19. When an abnormality has occurred, an instruction for eliminating the abnormality or an instruction for stopping the radar apparatus is outputted to the radar apparatus. Further, it is possible to notify a driver of the vehicle 1 of occurrence of an abnormality, via the vehicle control unit 19 by notification means 20.

The yaw rate sensor 16 detects a turning movement of the vehicle 1. As another means, a steering wheel angle sensor or the like can be used instead.

The travel speed sensor 17 is a sensor that detects a travel speed of the vehicle 1, and an example thereof is a sensor that detects a rotation speed of a wheel.

The vibration detection sensor 18 has installed therein a sensor that detects a change in a pitch angle of the vehicle. In a method, when the pitch angle in a time period determined in advance has changed by not less than a threshold, it is determined that the vehicle has vibrated.

The control apparatus 2 may perform a so-called sensor fusion process in which processing is performed using a combination of the distance from the radar apparatus 11 to 15 to the road surface, and the relative speed and the angle with respect to the road surface, in combination with a sensing result from a monocular camera, a stereo camera, LIDAR, an ultrasonic sensor, or the like. A configuration may be adopted in which a result of this sensor fusion is directly transmitted to the control apparatus 2, or a drive control signal for causing a vehicle control application to operate on the basis of the sensor fusion result is transmitted to the control apparatus 2.

The road surface reflection level reception unit 221 takes in the road surface reflection level observed by each radar apparatus 11 to 15, and stores the road surface reflection level into the storage unit 22. This is a preparatory operation for comparing road surface reflection levels between the radar apparatuses in a later process.

In an example method for obtaining the road surface reflection level by each radar apparatus 11 to 15, each radar apparatus 11 to 15 extracts a reflection level in a region in which the relative speed is substantially the same as that in a vicinity of a road surface.

For example, as described in Japanese Laid-Open Patent Publication No. 2018-21933, a reflection level Pr from a road surface can be obtained by the following formula (1). Here, a reference character Gtr is a transmission/reception combined gain including directivity. A reference character H is a height (m) from the road surface to the radar apparatus 11 to 15. A reference character L is a distance (m) along the horizontal direction from the vehicle 1 to a road surface corresponding to one distance included in a range of specific distances prescribed in advance. A reference character c2 is a constant prescribed in advance.

The road surface reflection level characteristically appears in the specific distance range. Therefore, components in the specific distance range prescribed in advance may all be transmitted to the control apparatus 2, or may partially be transmitted to the control apparatus 2. When there is room for the data transfer speed, components that are considered as corresponding to the road surface reflection level may all be transferred to the control apparatus 2.

As long as the differences in road surface reflection levels between the radar apparatuses can be compared, any means can be used as the means for obtaining road surface reflection levels from the radar apparatuses 11 to 15.

[Mathematical 1]

$$Pr = \frac{c2 \times Gtr\left(\mathrm{atan}\left(\frac{H}{L}\right)\right)}{(L^2 + H^2)^2} \quad (1)$$

Next, basic operation of the on-vehicle object detection system is described.

Figure 3:
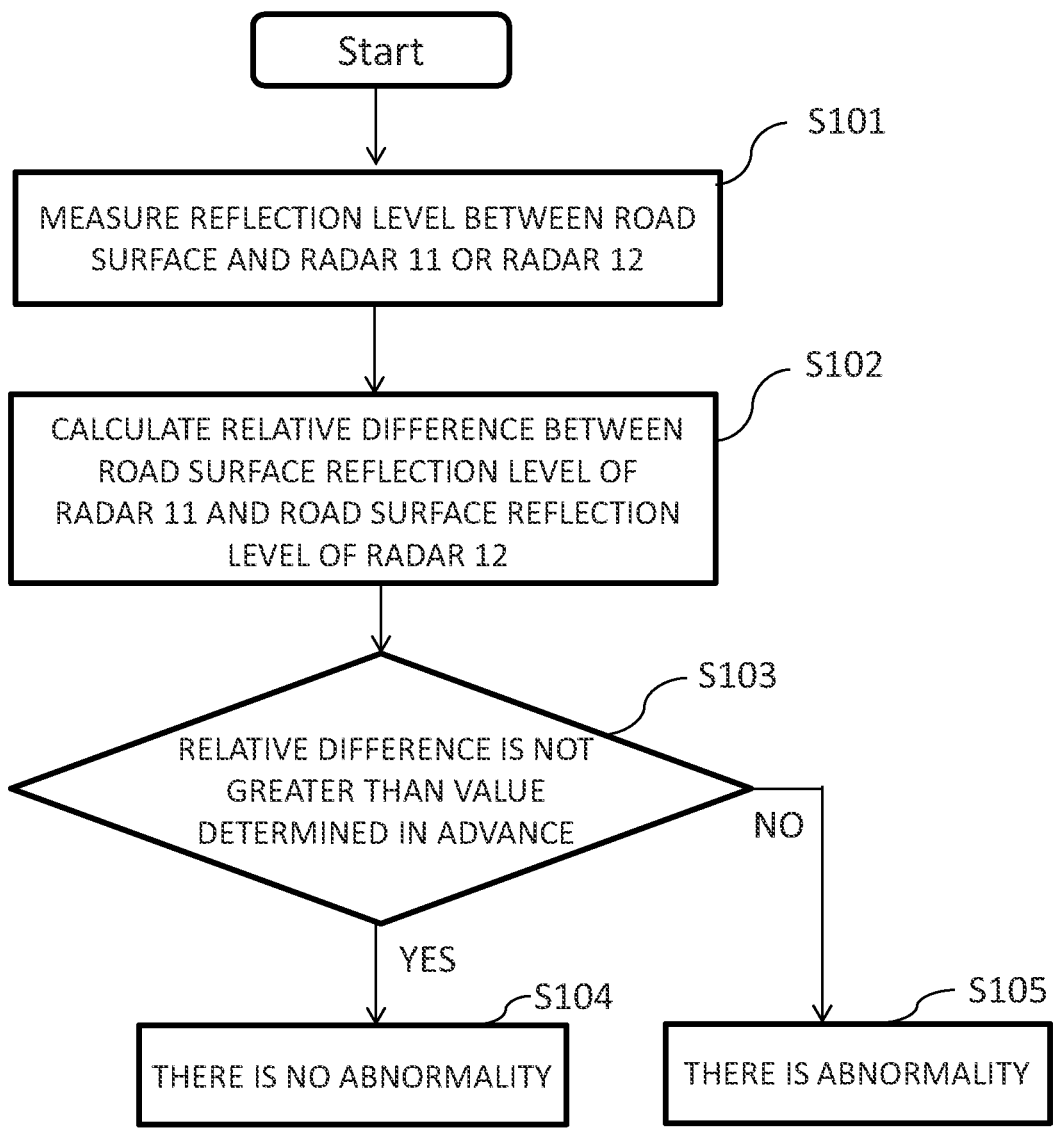
FIG. 3 is a flowchart describing basic operation of the on-vehicle object detection system of embodiment 1.

First, using the radar apparatus 11 and the radar apparatus 12, reflection levels with respect to the road surface are measured in the road surface reflection level reception unit 221 (step S101 in FIG. 3). The measured reflection levels are compared with each other and whether the radar apparatus 11 or the radar apparatus 12 has an abnormality is determined by the object detection apparatus abnormality determination unit 222. Specifically, a relative difference between the road surface reflection level measured by the radar apparatus 11 and the road surface reflection level measured by the radar apparatus 12 is determined (step S102), and when the relative difference is not greater than a value determined in advance (step S103), it is determined that there is no abnormality (step S104).

FIG. 4 shows an abnormality determination result. In FIG. 4, the row of the radar apparatus 11 on the left side shows the state of the radar apparatus 12 viewed from the radar apparatus 11, and indicates that there is no abnormality in this determination. In FIG. 4, the row of the radar apparatus 12 on the left side shows the state of the radar apparatus 11 viewed from the radar apparatus 12, and indicates that there is no abnormality in this determination.

When the difference between the road surface reflection level of the radar apparatus 11 and the road surface reflection level of the radar apparatus 12 is greater than the value determined in advance, it is determined that there is an abnormality (step S105 in FIG. 3). In FIG. 5, the row of the radar apparatus 11 on the left side shows the state of the radar apparatus 12 viewed from the radar apparatus 11, and indicates that there is an abnormality in this determination. In FIG. 5, the row of the radar apparatus 12 on the left side shows the state of the radar apparatus 11 viewed from the radar apparatus 12, and indicates that there is an abnormality in this determination. In this manner, as the on-vehicle object detection system, it is possible to determine the presence of an abnormality that has occurred in an installed radar apparatus, through comparison of road surface reflection levels between radar apparatuses. Here, examples of the abnormality include decreased performance and the like due to an axial deviation in the vertical direction or attachment of dirt, snow, or the like.

However, the above-described determination that there is an abnormality cannot identify which of the radar apparatus 11 and the radar apparatus 12 the abnormality has occurred in. For this, for example, the radar apparatus 11 may be provided with a function of self-determining the presence or absence of an abnormality, and when the radar apparatus 11 has self-determined that the radar apparatus 11 has no abnormality, the abnormality-occurring object detection apparatus identification unit 223 may identify that the radar apparatus 12 has an abnormality. As the self-determination means for an abnormality of the radar apparatus 11, in order to determine decreased performance of the radar apparatus, the following measures are known: a method in which a sensor (dirt attachment detection sensor) that monitors the presence or absence of an attached substance on the surface of the radar apparatus is mounted; a method in which the presence or absence of an attached substance on the surface of the radar apparatus is detected using information of the reflection intensity obtained by the radar apparatus; a method in which a sensor that detects an axial deviation amount is built in the radar apparatus to estimate an axial deviation amount; means for detecting an abnormality in an internal circuit; and the like. Any means for performing self-determination in a single radar apparatus may be used.

In such a configuration, without providing all of the radar apparatuses with a self-diagnosis function, the presence or absence of occurrence of an abnormality can be estimated. Accordingly, the total cost of the on-vehicle object detection system can be reduced.

Even when each radar apparatus has a self-diagnosis function, determination may take time depending on the configuration of the self-diagnosis function in some cases. For example, there may be a case where travel data is accumulated for a long time period such as 1 minute or 10 minutes, and whether or not an abnormality has occurred is determined through statistical processing. However, each radar apparatus may not necessarily be able to accumulate in this time period a sufficient amount of data that allows determination of an abnormality, and there may be a case where abnormality determination is completed only in some radar apparatuses. Even in such a case, if the abnormality determination is completed in at least one radar apparatus, the presence or absence of abnormalities in the other radar apparatuses can be determined through relative comparison. Therefore, an abnormality in a radar apparatus can be found early.

With respect to axial deviation in the vertical direction of a radar apparatus, as shown in an example in FIG. 6, the row of the radar apparatus 11 on the left side indicates that the radar apparatus 12 is deviated by 2 degrees upwardly when viewed from the radar apparatus 11. In FIG. 6, the row of the radar apparatus 12 on the left side indicates that the radar apparatus 11 is deviated by 2 degrees downwardly when viewed from the radar apparatus 12. When a radar apparatus is directed more upwardly, the road surface reflection level is reduced accordingly. When a radar apparatus is directed more downwardly, the road surface reflection level is increased accordingly. Utilizing this tendency, the road surface reflection level of either one of the radar apparatuses is used as a reference, and the relationship between the difference in the road surface reflection level with respect to the other radar apparatus and an axial deviation amount is stored in the form of a table in advance. Then, a relative amount of axial deviation occurring in a radar apparatus may be estimated on the basis of the relationship between the difference in the road surface reflection level between the radar apparatuses and the axial deviation amount. Accordingly, not only whether an abnormality has occurred but also how much the axis of a radar apparatus is deviated can be estimated. When the amount of the axial deviation is at a level that does not require issuing an alarm to the driver of the vehicle, the driver may not necessarily be notified of the axial deviation, and when the amount of the axial deviation is greater than that, the driver may be notified of the axial deviation.

In order to simplify the processing, as shown in FIG. 7, whether the axis is deviated upwardly or downwardly may be simply stored in a table. For example, when the road surface reflection level of the radar apparatus 12 is smaller when viewed from the radar apparatus 11, it can be considered that the axis of the radar apparatus 12 is relatively deviated upwardly, and conversely, the axis of the radar apparatus 11 is relatively deviated downwardly.

Next, operation of the abnormality-occurring object detection apparatus identification unit 223 when information of three radar apparatuses is used, is described. Similar to the above-described case of the two radar apparatuses 11, 12, the road surface reflection levels obtained by the radar apparatuses 11, 12, 13 are measured in the road surface reflection level reception unit 221. The measured road surface reflection levels are compared with each other, and whether the radar apparatus 11, the radar apparatus 12, or the radar apparatus 13 has an abnormality is determined by the object detection apparatus abnormality determination unit 222. FIG. 8 shows the result of the determination. As understood from the description above, as for the triangular portion of the upper right half and the triangular portion of the lower left half in the table shown in FIG. 8, only the viewing direction, i.e., which radar apparatus views the state of the other radar apparatus, is different. Thus, the indications in the table will be merely opposite relative to each other. Therefore, the following description is given, with determination examples shown only in the upper right half.

In the object detection apparatus abnormality determination unit 222, as shown in FIG. 8, when it has been determined that (1) there is an abnormality, as a result of comparison between the road surface reflection level of the radar apparatus 11 and the road surface reflection level of the radar apparatus 12, (2) there is an abnormality, as a result of comparison between the road surface reflection level of the radar apparatus 11 and the road surface reflection level of the radar apparatus 13, and (3) there is no abnormality, as a result of comparison between the road surface reflection level of the radar apparatus 12 and the road surface reflection level of the radar apparatus 13, the abnormality-occurring object detection apparatus identification unit 223 can identify that an abnormality has occurred in the radar apparatus 11. This utilizes a fact that it is difficult to consider that, with respect to the radar apparatus 12 and the radar apparatus 13, abnormalities in which the road surface reflection levels are at similar levels occur similarly in a plurality of radar apparatuses in the system. Therefore, although the radar apparatus in which an abnormality has occurred cannot be identified by using only two radar apparatuses, the radar apparatus in which an abnormality has occurred can be identified in the on-vehicle object detection system in which not less than three radar apparatuses are installed.

Figure 9:
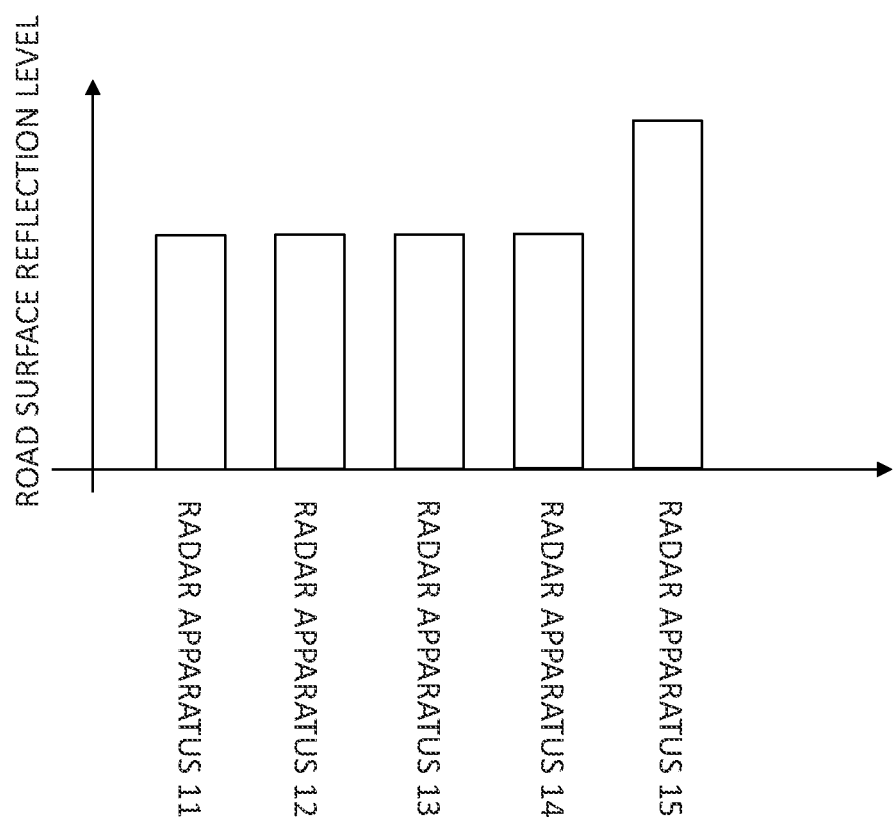
FIG. 9 is a diagram showing road surface reflection levels of respective radar apparatuses.

When comparing the road surface reflection levels between radars, the abnormality-occurring object detection apparatus identification unit 223 may identify that a radar apparatus for which the difference in the road surface reflection level is within a range of values determined in advance has no abnormality, and that a radar apparatus for which the difference in the road surface reflection level is outside the range of values determined in advance has an abnormality. For example, in a case as shown in FIG. 9, since only the radar apparatus 15 has a large difference in the road surface reflection level, the radar apparatus 15 is identified as a radar apparatus in which an abnormality has occurred. Conversely, when only the radar apparatus 15 has a small road surface reflection level, the radar apparatus 15 is similarly identified as a radar apparatus in which an abnormality has occurred.

Figure 10:
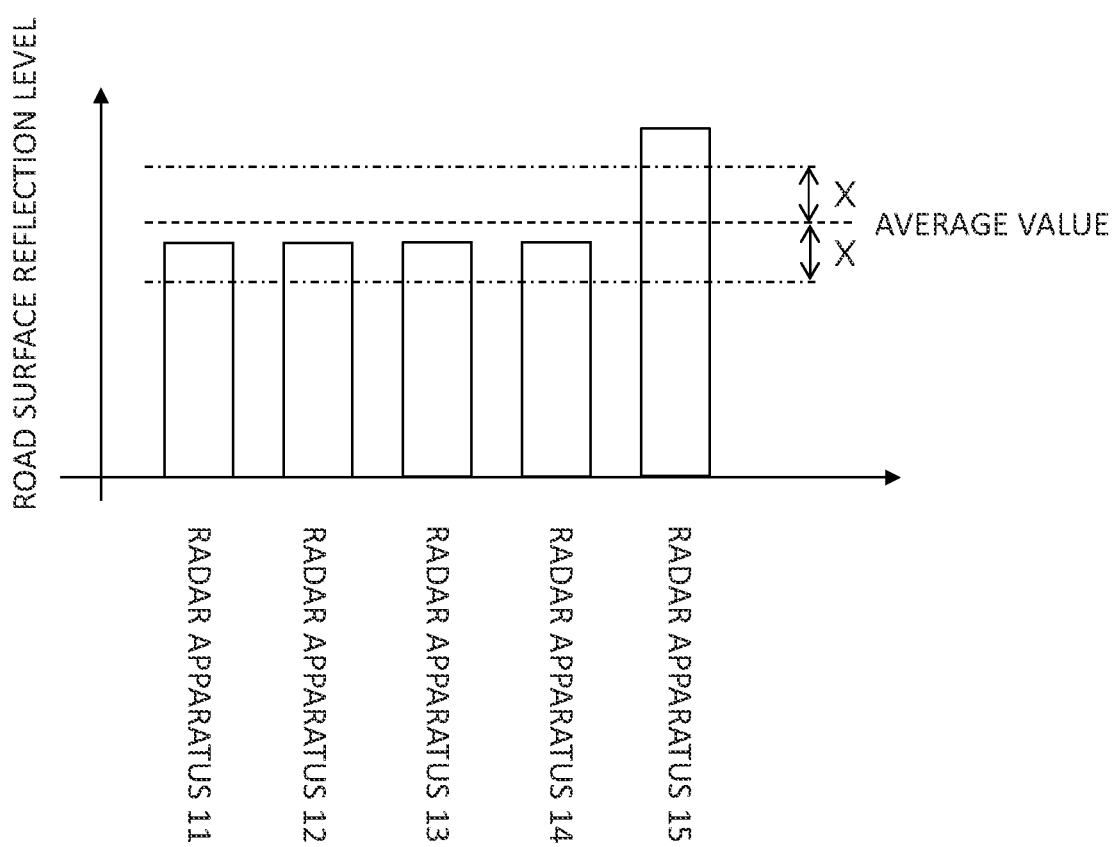
FIG. 10 is another diagram showing road surface reflection levels of respective radar apparatuses.

In still another example method, as shown in FIG. 10, when road surface reflection levels are compared between radar apparatuses, with respect to the average value of the road surface reflection levels, when the difference between the road surface reflection level of each radar apparatus and the average value is greater than a value X determined in advance, the corresponding radar apparatus 15 is identified as having an abnormality.

As described above, in embodiment 1, road surface reflection levels are compared between a plurality of object detection apparatuses. Therefore, the presence or absence of an abnormality can be determined in a greater variety of traveling environments and in a shorter time period than in a case where a single object detection apparatus determines an abnormality thereof.

[Technique for Preventing Erroneous Operation]

Figure 11:
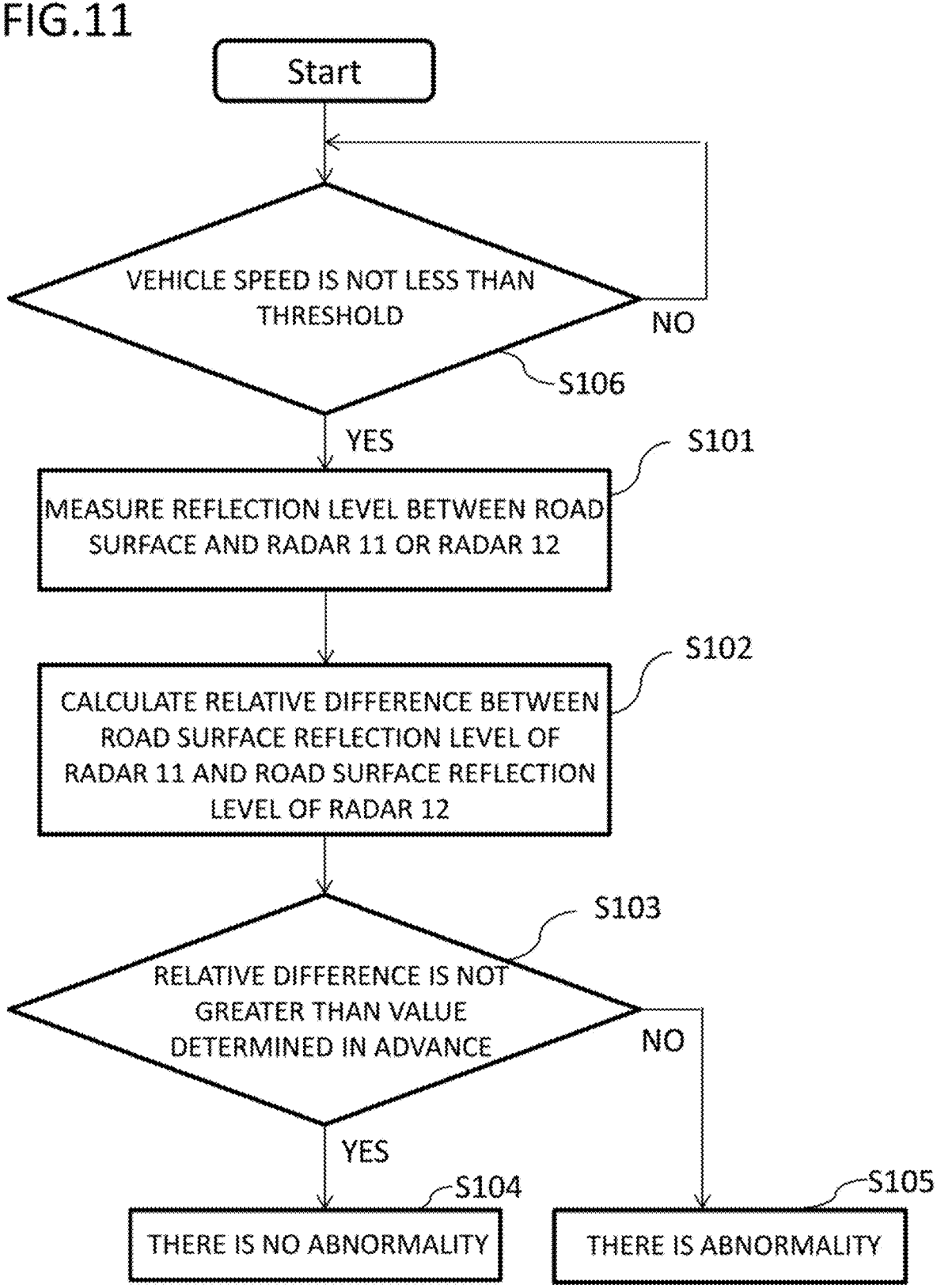
FIG. 11 is a flowchart describing additional operation for erroneous operation prevention for the on-vehicle object detection system of embodiment 1.
Figure 12:
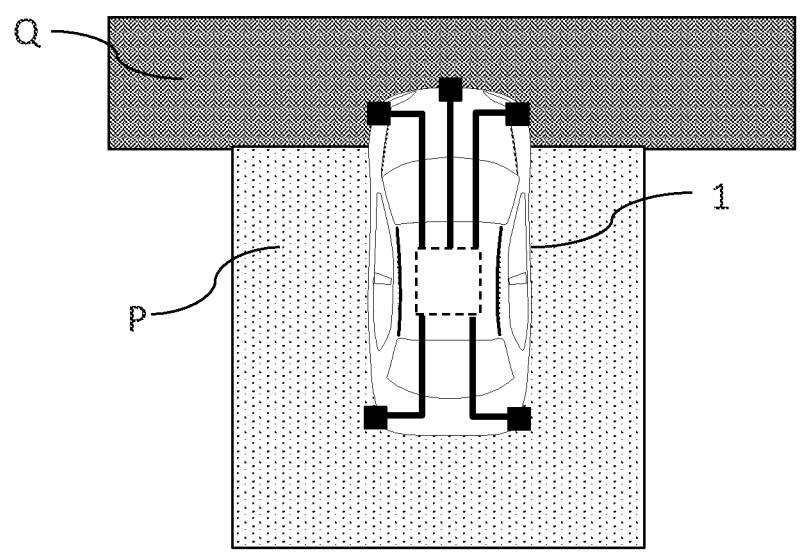
FIG. 12 is a diagram describing erroneous operation prevention for the on-vehicle object detection system of embodiment 1.

In order to prevent erroneous operation of the on-vehicle object detection system of embodiment 1, as shown in FIG. 11, abnormality determination may be performed when the vehicle speed is not less than a speed determined in advance (step S106). That is, when the speed of the vehicle is low, if the road surface states measured by radar apparatuses are different from each other, an erroneous abnormality determination may be made. An example thereof is that, as shown in FIG. 12, a parking space is in the form of a grass-joint ground P, an asphalt road Q is present in front of the vehicle 1, and the vehicle 1 starts from the parking space.

Whether or not the vehicle speed is not less than a threshold can be determined using a travel speed sensor or the like. For example, it may be determined that, when the vehicle speed is less than the threshold, the vehicle is stopped.

Figure 13:
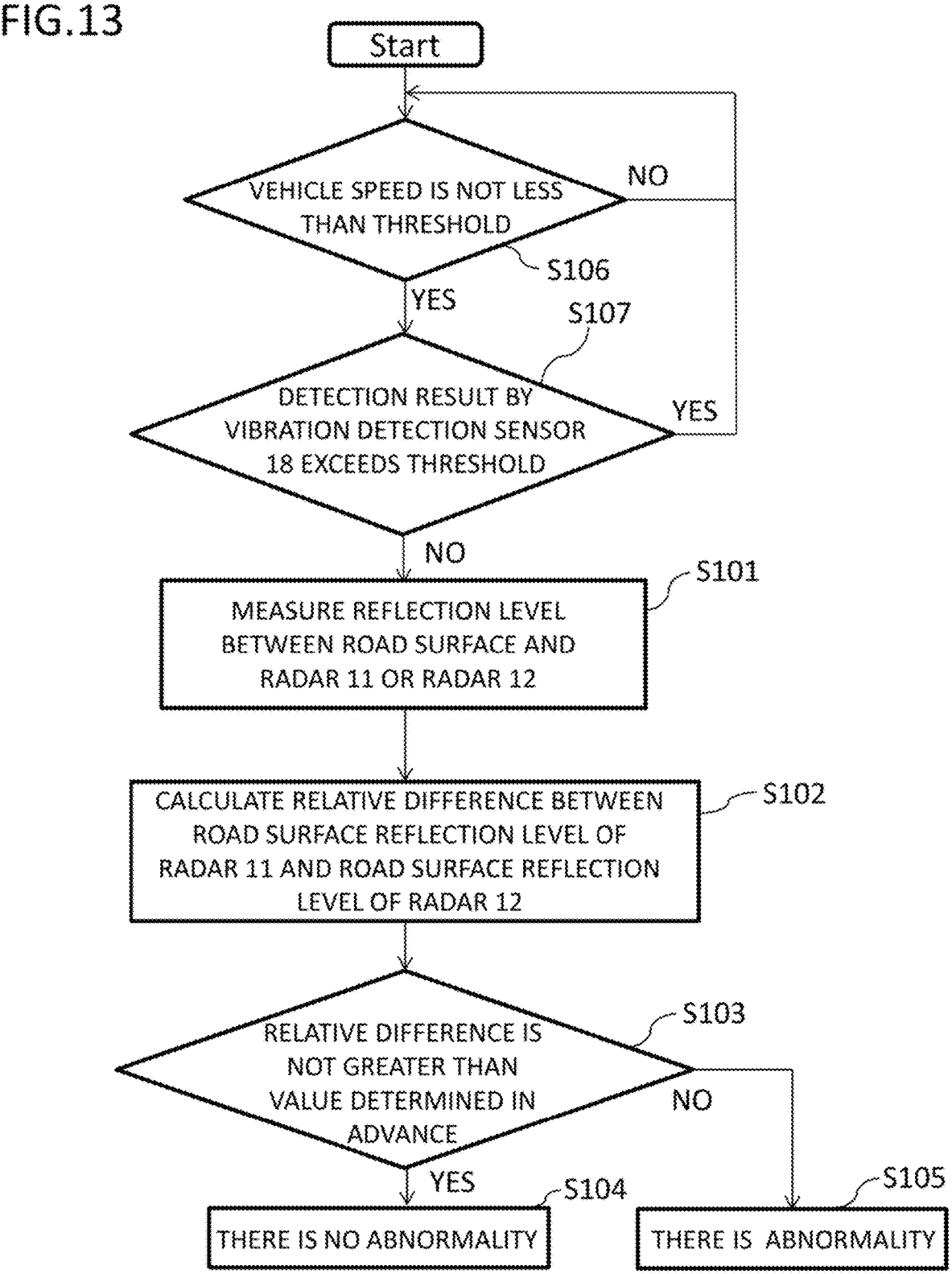
FIG. 13 is a flowchart describing additional operation for another erroneous operation prevention for the on-vehicle object detection system of embodiment 1.

Further, as shown in FIG. 13, the vibration detection sensor 18 detects the pitch angle in a certain time period, and when the pitch angle has changed by not less than a threshold, it may be determined that the vehicle 1 has vibrated, and detection of the road surface reflection level by the radar apparatus and determination as to the presence or absence of an abnormality in the radar apparatus may be prevented from being performed (step S107 in FIG. 13). That is, when the vehicle 1 has vibrated, e.g., when the vehicle 1 has gone over a small step or the like, the radar apparatus may be directed upwardly or downwardly relative to the road surface. In such a case, the angle of the radar apparatus with respect to the road surface is changed by the amount corresponding to the step. Under this influence, an erroneous abnormality determination may be made. Therefore, when vibration of the vehicle 1 has been detected, the process returns to the beginning without performing abnormality determination, and is started with detection of the vehicle speed. In FIG. 13, detection of vibration by the vibration detection sensor 18 is performed before measurement of the road surface reflection level. However, regardless of which stage, before the abnormality determination, vibration is detected in, the process may be returned to the beginning without performing abnormality determination.

Figure 14:
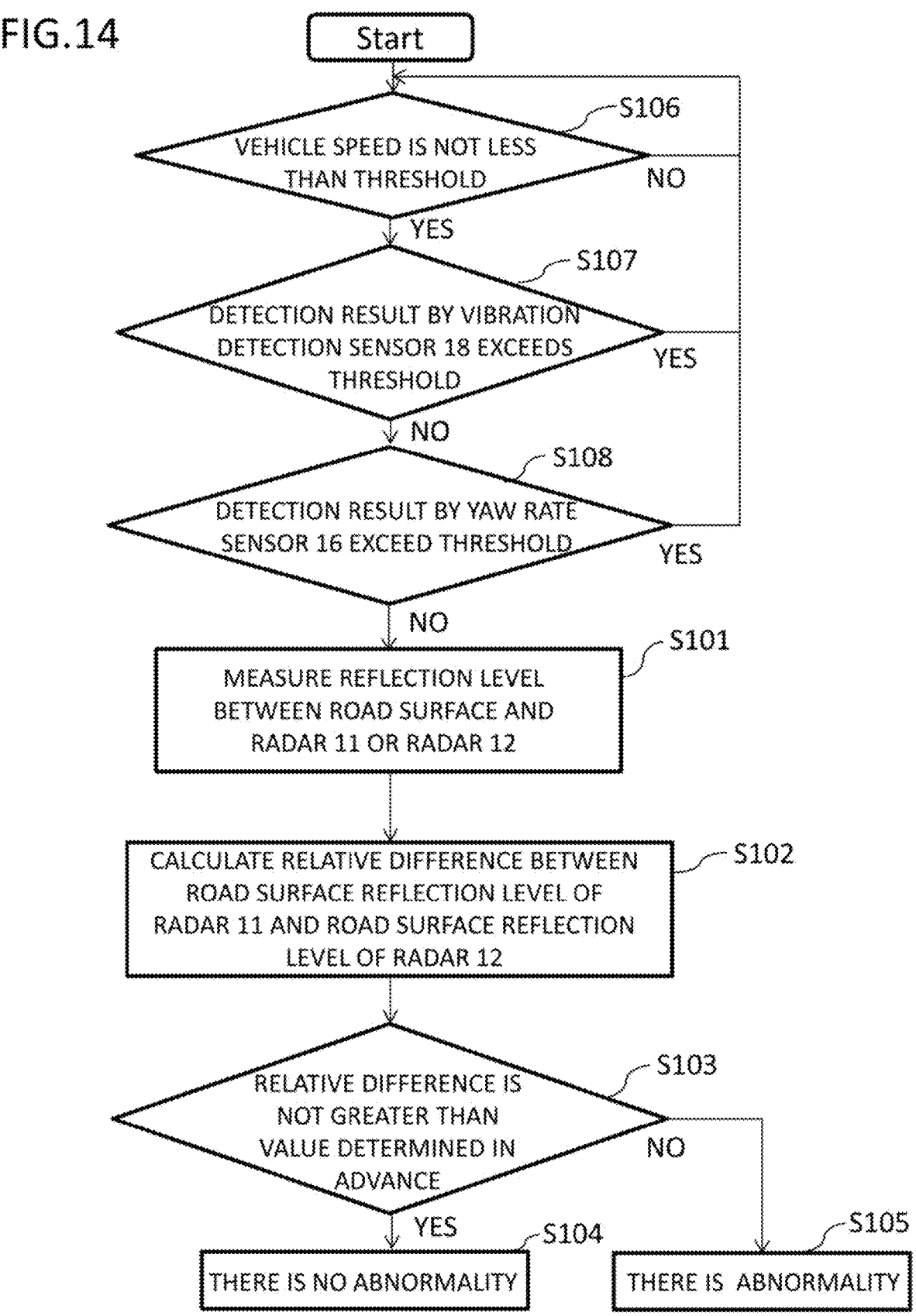
FIG. 14 is a flowchart describing additional operation for another erroneous operation prevention for the on-vehicle object detection system of embodiment 1.

When the vehicle is turning, the vehicle may, for example, be entering a road in which road surface states are different depending on a right turn or left turn, or be moving to a parking lot of a store or the like, and the road surface state may change accordingly. Therefore, when the vehicle is turning, i.e., when the result of detection by the yaw rate sensor 16 exceeds a threshold, abnormality determination is not performed (step S108 in FIG. 14). Accordingly, stable abnormality determination can be performed. In FIG. 14, detection of turning by the yaw rate sensor 16 is performed before the road surface reflection level is measured. However, regardless of which stage, before the abnormality determination, turning is detected in, the process may be returned to the beginning without performing abnormality determination.

Figure 15:
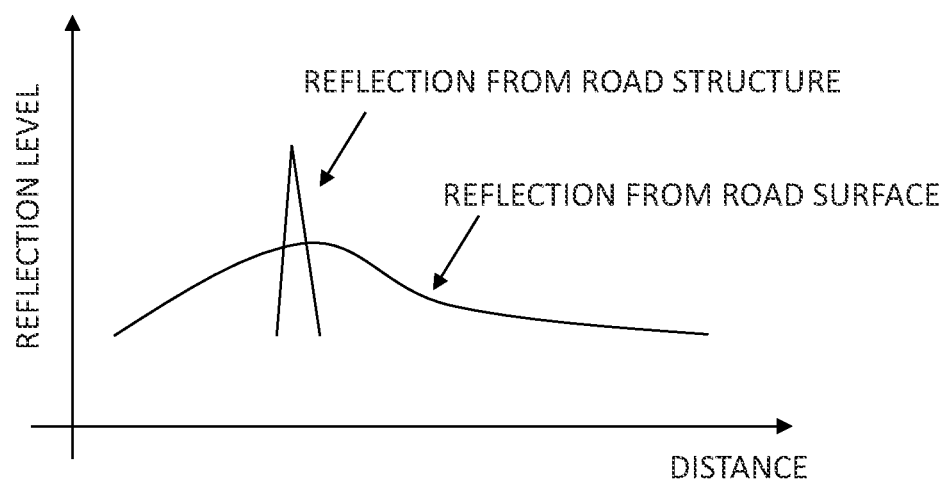
FIG. 15 is a diagram describing another erroneous operation prevention for the on-vehicle object detection system of embodiment 1.
Figure 16:
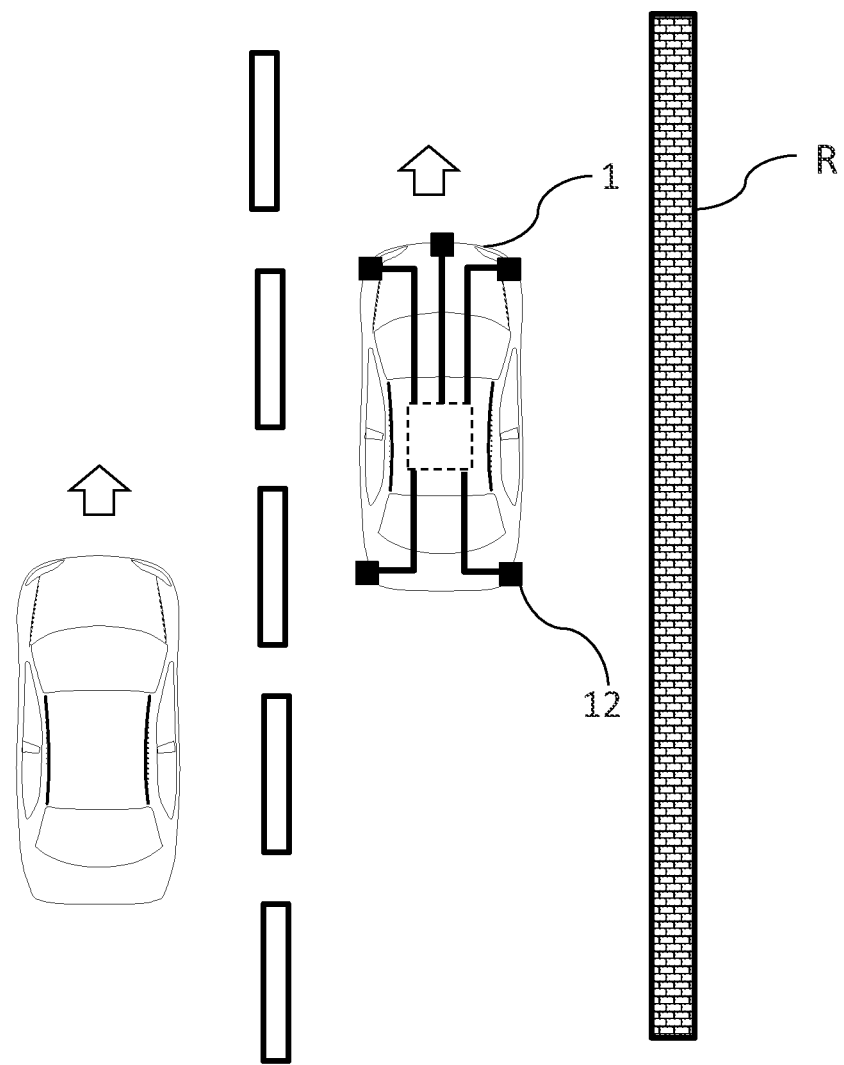
FIG. 16 is a diagram describing another erroneous operation prevention for the on-vehicle object detection system of embodiment 1.

When the vehicle 1 is traveling in an environment that has a road structure, reflection from the road structure is usually stronger than reflection from the road surface. Therefore, as shown in FIG. 15, in addition to reflection from the road surface, reflection from the road structure may be detected in a distance range corresponding to the road surface. Specifically, there are cases where an object, such as a side wall or a guardrail of the road, from which reflection is stronger when viewed from a radar apparatus is present within a distance similar to the distance at which a road surface reflection level is obtained. In such a case, the road surface reflection level detected by the radar apparatus includes a component of a reflection level not less than a threshold determined in advance. For example, as shown in FIG. 16, in an environment where the vehicle 1 having the radar apparatus 12 mounted to a right rear portion thereof is traveling in a right lane and a side wall R is present on the right side, reflection from the side wall is strong. As a result, the road surface reflection level includes a component of a reflection level not less than a predetermined threshold. In such a case, it is determined that the road surface reflection level cannot be appropriately received, and determination as to the presence or absence of an abnormality is not performed. Accordingly, the frequency at which erroneous determination is made can be reduced.

In an environment where the road surface reflection level is low, whether or not there is an abnormality is difficult to be determined because the reflection level is too low. In such an environment, abnormality determination may not necessarily be performed. Accordingly, for example, in a case of a road surface environment that is flatter, such as a concrete road surface, than an asphalt road surface, occurrence of erroneous abnormality determination due to reduced road surface reflection can be avoided. The environment where the road surface reflection level is low is determined on the basis of the road surface reflection levels of two or more radar apparatuses becoming lower than a threshold determined in advance.

In a scene where the reflection intensity suddenly changes, e.g., from a concrete road surface to an asphalt road surface, there is a risk that relative comparison between road surface reflection levels does not appropriately operate. Therefore, abnormality determination may not necessarily be performed when temporal change in the road surface reflection level of any of the radar apparatuses is greater than a threshold determined in advance. Accordingly, occurrence of erroneous abnormality determination in a scene where the reflection intensity suddenly changes can be avoided.

All of the above-described means for preventing erroneous operation may be provided, or some of the above-described means may be selectively provided in accordance with the vehicle type, the traveling environment, or the like.

[Normalization of Road Surface Reflection Level]

Figure 17:
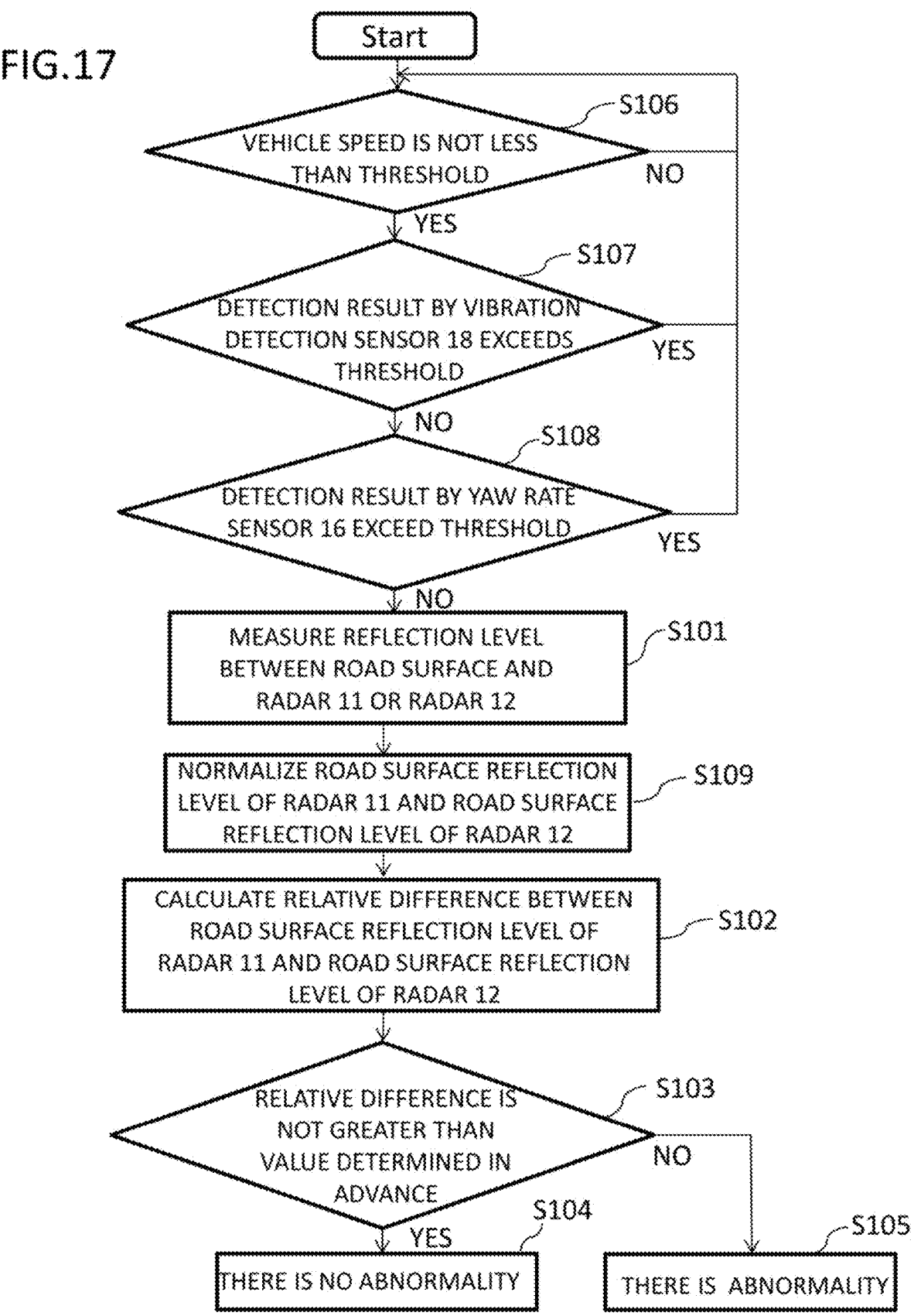
FIG. 17 is a flowchart describing additional operation for normalization for the on-vehicle object detection system of embodiment 1.

The radar apparatuses 11, 12, and 13 described in embodiment 1 are not necessarily mounted with a completely same specification and at a completely same height. In such a case, as shown in FIG. 17, for example, it is preferable that the road surface reflection levels are normalized between the radar apparatus 11 and the radar apparatus 12 (step S109 in FIG. 17) and the road surface reflection levels can be compared on the basis of the same index between the radar apparatuses.

Examples of the normalization subject include (1) to (5) below. These may be used individually or in combination. The normalization technique is not limited to (1) to (5).

(1) The reflection intensity obtained by a radar apparatus is known to be in inverse proportion of the fourth power of the distance. Since a millimeter wave radar can detect the distance to the road surface, if each obtained road surface reflection level is corrected with an attenuation corresponding to the fourth power of the distance, the road surface reflection levels between radar apparatuses can be compared, with the influence of the distance suppressed.

(2) An antenna gain in the horizontal direction is also a correction subject for normalization. An antenna has directivity in a predetermined direction. Characteristics of this directivity are obtained in advance. Then, the road surface reflection intensity is corrected by an amount corresponding to the antenna gain in the horizontal direction by using an angle measurement value in the horizontal direction obtained by the radar apparatus. Accordingly, the road surface reflection levels can be compared while the influence of the difference in the antenna gain in the horizontal direction between radar apparatuses is suppressed.

(3) An antenna gain in the vertical direction is also a correction subject for normalization. When the axis is not deviated in the vertical direction, the direction of the road surface, when viewed from a radar apparatus, is uniquely determined by the mounting height and the distance to the road surface. The antenna gain in the vertical direction is obtained in advance. Then, on the basis of information of the distance to the road surface obtained by the radar apparatus, the angle in the vertical direction between the radar apparatus and the road surface is determined, and correction of the antenna gain in the vertical direction is performed. Accordingly, the road surface reflection levels between radar apparatuses can be compared while the influence of the difference in the antenna gain in the vertical direction between the radars is suppressed.

(4) Characteristics of hardware forming a radar apparatus are also a correction subject for normalization. For example, there are cases where, in a radar apparatus, a signal received by an antenna is inputted to an AD converter through a lowpass filter, a highpass filter, an amplifier, and the like. In such a case, when the road surface reflection intensity is corrected in consideration of the characteristics of these circuit components, the road surface reflection levels can be compared while the influence of the difference in the characteristics of the hardware of the radar apparatuses is suppressed.

(5) A radar cross section (RCS) indicating the reflecting ability of a target with respect to an incident radar wave is estimated, and this estimated value may be used instead of a normalized road surface reflection intensity. The radar cross section can be calculated using a radar equation on the basis of the reflected power from the road surface, the distance between the antenna and the road surface, characteristics of the antenna, hardware characteristics of the radar, and the like. Further, results in the form of a table created in advance with a range of representative values and steps determined in advance may be referred to. For creation of the table, results calculated by using a radar equation may be used, or results actually measured by using a reflector for which the radar cross section is known may be used.

Including (1) to (5) described above, in a case where there is a difference in the road surface reflection level between radar apparatuses, if the difference in the road surface reflection level is obtained in advance, correction is performed by the amount corresponding thereto, and then the road surface reflection levels are compared, the road surface reflection levels can be compared while the influence of the difference in the road surface reflection level between radar apparatuses is suppressed.

It should be noted that normalization of the road surface reflection level is not necessarily essential. For example, even when normalization is not performed, if there is no large difference in the value of the road surface reflection level between radar apparatuses, and abnormality determination for a desired radar apparatus can be performed, the normalization is not essential. In addition, when all of the radar apparatuses have the same specification and the same mounting condition, the normalization is not essential.

[Measures to be Taken when it is Determined that there is an Abnormality]

A result of determination, by the object detection apparatus abnormality determination unit 222, that there is an abnormality is notified to the vehicle control unit 19 via the communication function unit 23 shown in FIG. 2. The vehicle control unit 19 having received the notification of the abnormality becomes able to stop vehicle control or restrict a part of operation of the vehicle control.

Further, on the basis of an instruction from the vehicle control unit 19, the notification means 20 may notify the driver of the occurrence of an abnormality, and urge the driver to check, for example, whether or not the radar apparatus is dirty.

When the difference in the road surface reflection level between radar apparatuses is small, the degree of abnormality is considered to be small. In such a case, the degree of abnormality may be determined in a stepped manner. For example, when the degree of abnormality is small, a specific vehicle control application may be stopped or may have the function thereof suppressed. For example, during high speed traveling, an ability of detecting an object far away is required. In contrast, during low speed traveling, even if the ability of detecting is available only for a short distance, e.g., not greater than 100 m, a vehicle control application such as ACC (Adaptive Cruise Control) or AEB (Automatic Emergency Braking) is not significantly influenced. Therefore, the operation of the application may be, for example, allowed to be continued during occurrence of such an abnormality.

Further, the object detection apparatus abnormality determination unit 222 may notify the radar apparatus of the presence or absence of occurrence of an abnormality. The radar apparatus that has been notified of an abnormality can execute a process that is to be performed at occurrence of an abnormality. For example, as an abnormality occurring in a radar apparatus, there is a possible case where the radar apparatus cannot appropriately receive reflection from the road surface due to attachment of snow. For such a case, a heater or the like may be mounted to the radar apparatus 11 to 15.

In a configuration in which the ambient atmosphere temperature can be obtained, when the ambient atmosphere temperature is lower than a predetermined temperature and the object detection apparatus abnormality determination unit 222 has determined that there is an abnormality, a heater may be operated for a certain time period to monitor whether or not the abnormality is eliminated as a result of snow being melted.

In a case where a radar apparatus in which an abnormality has occurred can be identified by the abnormality-occurring object detection apparatus identification unit 223, notification of occurrence of an abnormality may be issued only to the radar apparatus, to cause a heater to be operated. In a case where a radar apparatus in which an abnormality has occurred cannot be identified, notification of occurrence of an abnormality of the on-vehicle object detection system is issued to all radar apparatuses as the apparatuses that have been determined as having an abnormality by the object detection apparatus abnormality determination unit 222, to cause heaters of all of the radar apparatuses to operate, and whether the abnormality is eliminated may be monitored. In a case where the abnormality is not eliminated even when the heater is operated, the abnormality may be of another kind. Therefore, for example, when an axial deviation in the vertical direction of a radar is suspected, an operation of correcting the orientation of the axis may be performed.

Other than causing a radar apparatus to perform an operation of eliminating the abnormality, the operation of the radar apparatus itself may be stopped. Even when the radar apparatus in which an abnormality has occurred is allowed to continue to operate but when operation of the vehicle control application cannot be assured, if operation of the corresponding radar apparatus is stopped, power consumption of the on-vehicle object detection system can be reduced.

Embodiment 2

It is considered that the radar apparatus 11 and the radar apparatus 12, or the radar apparatus 14 and the radar apparatus 15, which are installed on the same side, i.e., on the right side or on the left side, of the vehicle 1 detect substantially the same road surface. Therefore, more accurate abnormality determination can be performed when the road surface reflection levels of the radar apparatuses installed on the same side are compared, than when the road surface reflection levels of the radar apparatuses installed on different sides are compared.

Figure 18:
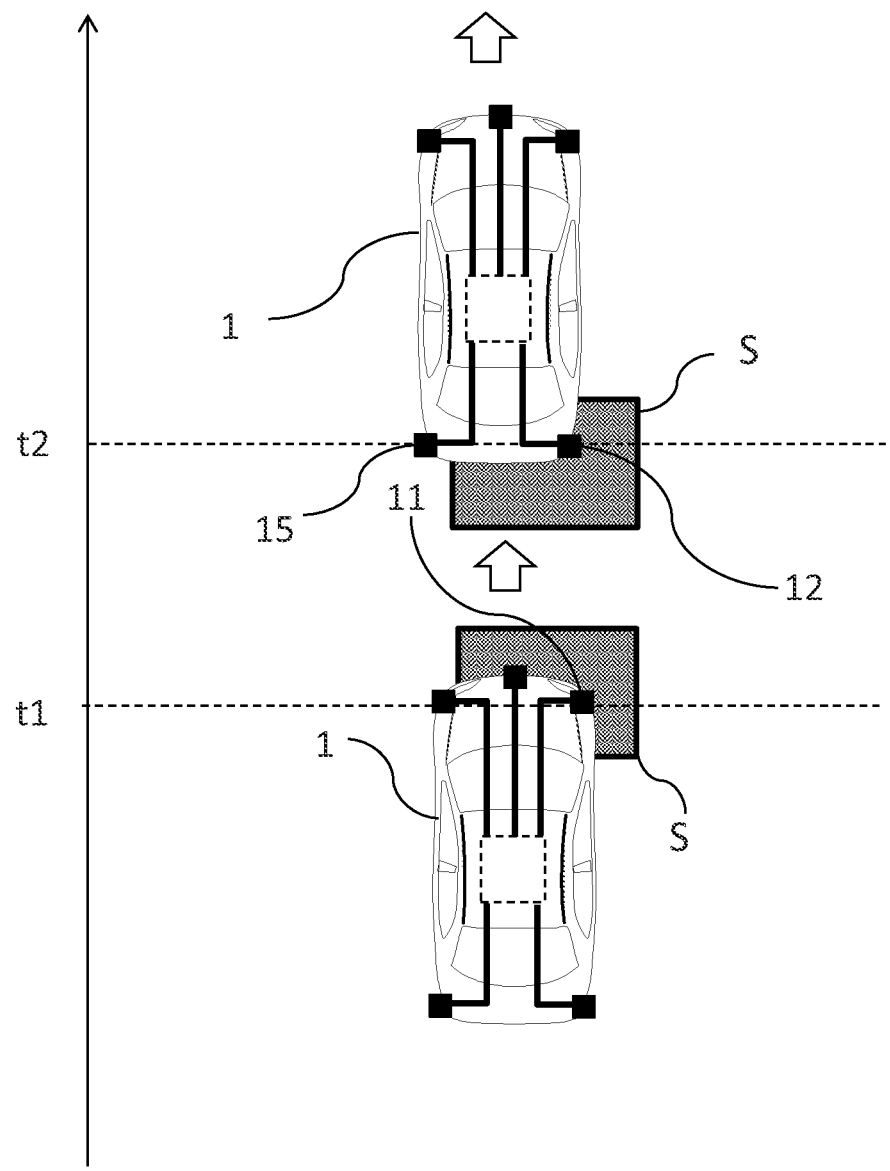
FIG. 18 is a diagram describing operation of embodiment 2.

For example, as shown in FIG. 18, when the vehicle 1 is travelling, a road surface S detected at a time t1 by the radar apparatus 11 is detected at a time t2 by the radar apparatus 12. Thus, an abnormality in an object detection apparatus can be more accurately determined when comparison is performed between object detection apparatuses that are configured to detect the same road surface. In order to obtain such an effect, the road surface reflection level of the road surface S detected at the time t1 by the radar apparatus 11 is stored into the storage unit 22, and then, is compared with the road surface reflection level of the road surface S detected at the time t2 by the radar apparatus 12. Accordingly, the road surface reflection levels obtained by performing detection on substantially the same road surface can be compared between the radar apparatuses. Therefore, abnormality determination can be less likely to be erroneous. In addition, when the road surface reflection level detected by the radar apparatus 13 at the time t1 is stored, and then is compared with the road surface reflection level detected by the radar apparatus 15 that passes the road surface in substantially the same range at the time t2 after a certain time period, abnormality determination can also be less likely to be erroneous.

Although the present disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 vehicle
2 control apparatus
11, 12, 13, 14, 15 radar apparatus (object detection apparatus)
16 yaw rate sensor
17 travel speed sensor
18 vibration detection sensor
19 vehicle control unit
20 notification means
21 calculation unit
22 storage unit
23 communication function unit
24 bus
221 road surface reflection level reception unit
222 object detection apparatus abnormality determination unit
223 abnormality-occurring object detection apparatus identification unit

The invention claimed is:

1. An on-vehicle object detection system comprising:
a plurality of object detection apparatuses mounted to a vehicle and configured to detect reflections signals from a target road surface area;
a road surface reflection level reception circuitry to receive a plurality of road surface reflection levels of the target road surface area which are detected by the plurality of object detection apparatuses;
an object detection apparatus abnormality determination circuitry to calculate a difference between two or more road surface reflection levels having been received from the plurality of object detection apparatuses, and determine, when the difference exceeds a range of values determined in advance, that any of the plurality of object detection apparatuses has an abnormality; and
a yaw rate sensor configured to detect a turning movement of the vehicle,
wherein, when, among the detected road surface reflection levels, there is a road surface reflection level greater than a threshold determined in advance, an abnormality determination for determining any of the plurality of object detection apparatuses has an abnormality, is disabled, when change in a detected road surface reflection level is greater than another threshold determined in advance, the abnormality determination is disabled, and when the turning movement of the vehicle is greater than a predetermined threshold, the abnormality determination is disabled.

2. The on-vehicle object detection system according to claim 1, further comprising
an abnormality-occurring object detection apparatus identification circuitry to identify an object detection apparatus in which the abnormality has occurred, by acquiring an axial deviation amount of the object detection apparatus based on the difference between the two or more road surface reflection levels.

3. The on-vehicle object detection system according to claim 1, wherein
the object detection apparatus abnormality determination circuitry determines that, between the plurality of object detection apparatuses, the plurality of object detection apparatuses for which a difference between the road surface reflection levels is in a range determined in advance have no abnormality, and the plurality of object detection apparatuses for which a difference between the road surface reflection levels is outside the range determined in advance have an abnormality.

4. The on-vehicle object detection system according to claim 1, further comprising an abnormality-occurring object detection apparatus identification circuitry, wherein
the abnormality-occurring object detection apparatus identification circuitry calculates a difference in a combination of road surface reflection levels of respective three or more object detection apparatuses, and identifies an object detection apparatus in which an abnormality has occurred, on the basis of a combination of object detection apparatuses that have been determined as having an abnormality and a combination of object detection apparatuses that have been determined as having no abnormality.

5. The on-vehicle object detection system according to claim 1, further comprising an abnormality-occurring object detection apparatus identification circuitry, wherein
the abnormality-occurring object detection apparatus identification circuitry identifies that an object detection apparatus for which a difference between an average value of the plurality of road surface reflection levels detected by the plurality of object detection apparatuses and the road surface reflection level of the object detection apparatus is greater than a value determined in advance is an object detection apparatus in which an abnormality has occurred.

6. The on-vehicle object detection system according to claim 1, further comprising an abnormality-occurring object detection apparatus identification circuitry, wherein
among the plurality of object detection apparatuses, at least one object detection apparatus performs self-diagnosis about presence or absence of occurrence of an abnormality, and the abnormality-occurring object detection apparatus identification circuitry identifies, on the basis of a result of the self-diagnosis, presence or absence of occurrence of an abnormality in remaining object detection apparatuses.

7. The on-vehicle object detection system according to claim 1, wherein
when road surface reflection levels detected by two or more object detection apparatuses are smaller than another threshold determined in advance, in order to avoid occurrence of erroneous abnormality determination due to reduced road surface reflection level like concrete road surface, the abnormality determination process is disabled.

8. The on-vehicle object detection system according to claim 1, wherein
when a speed of the vehicle is slower than a speed determined in advance, the abnormality determination process is disabled.

9. The on-vehicle object detection system according to claim 1, wherein
when vibration of the vehicle has been detected, the abnormality determination process is disabled.

10. The on-vehicle object detection system according to claim 1, wherein
the object detection apparatus abnormality determination circuitry notifies a vehicle controller of an abnormality determination result.

11. The on-vehicle object detection system according to claim 10, wherein
the vehicle controller stops a function of vehicle control or restricts a function of vehicle control on the basis of the notified abnormality determination result.

12. The on-vehicle object detection system according to claim 1, wherein
the object detection apparatus abnormality determination circuitry notifies an object detection apparatus of an abnormality determination result.

13. The on-vehicle object detection system according to claim 12, wherein
the object detection apparatus that has been notified of the abnormality determination result performs an operation of eliminating an abnormality.

14. The on-vehicle object detection system according to claim 1, wherein the plurality of object detection apparatuses comprises a first object detection apparatus and a second object detection apparatus that are installed on a first side of the vehicle, and a third object detection apparatus and a fourth object detection apparatus that are installed on a second side of the vehicle,
the object detection apparatus abnormality determination circuitry calculates the difference between the two or more road surface reflection levels by comparing a first road surface reflection level detected by the first object detection apparatus at time T1 with a second road surface reflection level detected by the second object detection apparatus at time T2, without comparing the first road surface reflection level with a third road surface reflection level detected by the third object detection apparatus or a fourth road surface reflection level detected by the fourth object detection apparatus.

15. The on-vehicle object detection system according to claim 1, wherein
abnormality determination is performed on the basis of a difference between a road surface reflection level detected by a first object detection apparatus, and a reflection level of a same road surface as that for which the first object detection apparatus has performed the detection, the reflection level being detected, after the detection by the first object detection apparatus, by a second object detection apparatus installed on a same side as the first object detection apparatus.

16. An on-vehicle object detection system comprising:
a plurality of object detection apparatuses mounted to a vehicle and configured to detect reflections signals from a target road surface area;
a road surface reflection level reception circuitry to receive a plurality of road surface reflection levels of the target road surface area which are detected by the plurality of object detection apparatuses;
a yaw rate sensor configured to detect a turning movement of the vehicle; and
an object detection apparatus abnormality determination circuitry to calculate a difference between two or more road surface reflection levels having been received from the plurality of object detection apparatuses, and determine, when the difference exceeds a range of values determined in advance, that any of the plurality of object detection apparatuses has an abnormality, wherein
when performing comparison of the road surface reflection levels between the plurality of object detection apparatuses, the object detection apparatus abnormality determination circuitry performs normalization of the road surface reflection levels and then performs the comparison, and
when the turning movement of the vehicle is greater than a predetermined threshold, an abnormality determination for determining any of the plurality of object detection apparatuses has an abnormality, is disabled.

17. The on-vehicle object detection system according to claim 16, wherein
in the normalization of the road surface reflection levels, change in a road surface reflection intensity due to a distance is corrected.

18. The on-vehicle object detection system according to claim 16, wherein
in the normalization of the road surface reflection levels, change in a road surface reflection intensity due to an antenna gain is corrected.

19. The on-vehicle object detection system according to claim 16, wherein
in the normalization of the road surface reflection levels, change in a road surface reflection intensity due to a characteristic of hardware forming the object detection apparatus is corrected.

20. The on-vehicle object detection system according to claim 16, wherein
when the object detection apparatus is a radar apparatus, change in a road surface reflection intensity is corrected on the basis of an RCS estimation value.

21. An on-vehicle object detection system comprising:
a plurality of object detection apparatuses mounted to a vehicle and configured to detect reflections signals from a target road surface area;
a road surface reflection level reception circuitry to receive a plurality of road surface reflection levels of the target road surface area which are detected by the plurality of object detection apparatuses;
a yaw rate sensor configured to detect a turning movement of the vehicle; and
an object detection apparatus abnormality determination circuitry to calculate a difference between two or more road surface reflection levels having been received from the plurality of object detection apparatuses, and determine, when the difference exceeds a range of values determined in advance, that any of the plurality of object detection apparatuses has an abnormality, wherein
when the turning movement of the vehicle is greater than a predetermined threshold, an abnormality determination process for determining any of the plurality of object detection apparatuses has an abnormality, is disabled.

* * * * *